(12) United States Patent
Laursen et al.

(10) Patent No.: US 8,028,452 B2
(45) Date of Patent: Oct. 4, 2011

(54) ENHANCED PATCH PANEL INDICIA SYSTEM

(75) Inventors: Erik Laursen, Kirkland, WA (US); Patrick S. McNutt, Carnation, WA (US); Edward R. Burns, Kirkland, WA (US)

(73) Assignee: Leviton Manufacturing Co., Ltd., Melville, NY (US)

( * ) Notice: Subject to any disclaimer, the term of this patent is extended or adjusted under 35 U.S.C. 154(b) by 345 days.

(21) Appl. No.: 12/253,728

(22) Filed: Oct. 17, 2008

(65) Prior Publication Data

US 2010/0095572 A1    Apr. 22, 2010

(51) Int. Cl.
*G09F 3/18* (2006.01)
*G09F 3/20* (2006.01)
*H02G 3/14* (2006.01)
*H05K 5/03* (2006.01)
*F16L 3/22* (2006.01)
*H05K 7/00* (2006.01)
*H05K 1/00* (2006.01)
*H05K 7/14* (2006.01)
*H05K 7/18* (2006.01)

(52) U.S. Cl. ........... 40/649; 174/66; 248/68.1; 361/728; 361/796; 361/752; 361/814

(58) Field of Classification Search ............... 40/649; 174/66; 248/68.1; 361/728, 752, 796, 814
See application file for complete search history.

(56) References Cited

U.S. PATENT DOCUMENTS

| | | | |
|---|---|---|---|
| 2,041,097 A | 5/1936 | Vierling | |
| 2,388,431 A | 11/1945 | Neiman | |
| 3,409,347 A | 11/1968 | Vogel | |
| 4,780,573 A * | 10/1988 | Own | 174/66 |
| 5,613,874 A | 3/1997 | Orlando et al. | |
| 5,675,125 A * | 10/1997 | Hollinger | 174/66 |
| 5,983,539 A | 11/1999 | Martin et al. | |
| 6,053,764 A | 4/2000 | Curry et al. | |
| 6,282,826 B1 * | 9/2001 | Richards | 40/654.01 |
| 6,347,715 B1 | 2/2002 | Drozdenko et al. | |
| 2003/0124908 A1 | 7/2003 | Chen | |
| 2006/0059757 A1 | 3/2006 | Didulo | |
| 2008/0090461 A1 | 4/2008 | Pepe et al. | |
| 2009/0194226 A1* | 8/2009 | Tabet | 156/230 |

FOREIGN PATENT DOCUMENTS

KR        200422110     7/2006
WO   PCT/US2009/061104     5/2010

* cited by examiner

*Primary Examiner* — Joanne Silbermann
*Assistant Examiner* — Syed A Islam
(74) *Attorney, Agent, or Firm* — Davis Wright Tremaine LLP; George C. Rondeau, Jr.; Heather M. Colburn

(57) ABSTRACT

An enhanced patch panel indicia system includes a cover to receive a backing as the primary indicia receiver and to receive labels as auxiliary indicia receivers. The indicia system further includes an enhanced patch panel with a front face. The cover can include clip members to allow the cover to be snap-fitted onto the front face of the patch panel with the cover in juxtaposition with the front face, and in some implementations, the backing positioned therebetween.

25 Claims, 7 Drawing Sheets

ENHANCED PATCH PANEL INDICIA SYSTEM

BACKGROUND OF THE INVENTION

1. Field of the Invention

The present invention relates to cable management devices for network equipment racks including patch panels.

2. Description of the Related Art

A patch panel is useful as a support panel for mounting reconfigurable ports for patching components in a network rack. Conventional patch panels involve various cables for patching, rack mounted components, and other aspects that at times may require identification or otherwise association via textual or graphical means. Conventional approaches are helpful in this regard, but can be improved upon.

BRIEF DESCRIPTION OF THE SEVERAL VIEWS OF THE DRAWING(S)

DETAILED DESCRIPTION OF THE INVENTION

As discussed herein, an enhanced patch panel indicia system includes a cover that can receive a backing as the primary indicia receiver and can receive labels as auxiliary indicia receivers. The indicia system further includes an enhanced patch panel with a front face. The cover can include clip members to allow the cover to be snap-fitted onto the front face of the patch panel with the cover in juxtaposition with the front face and the backing positioned therebetween. In some implementations, the labels are positioned between the cover and the backing.

Figure 1:
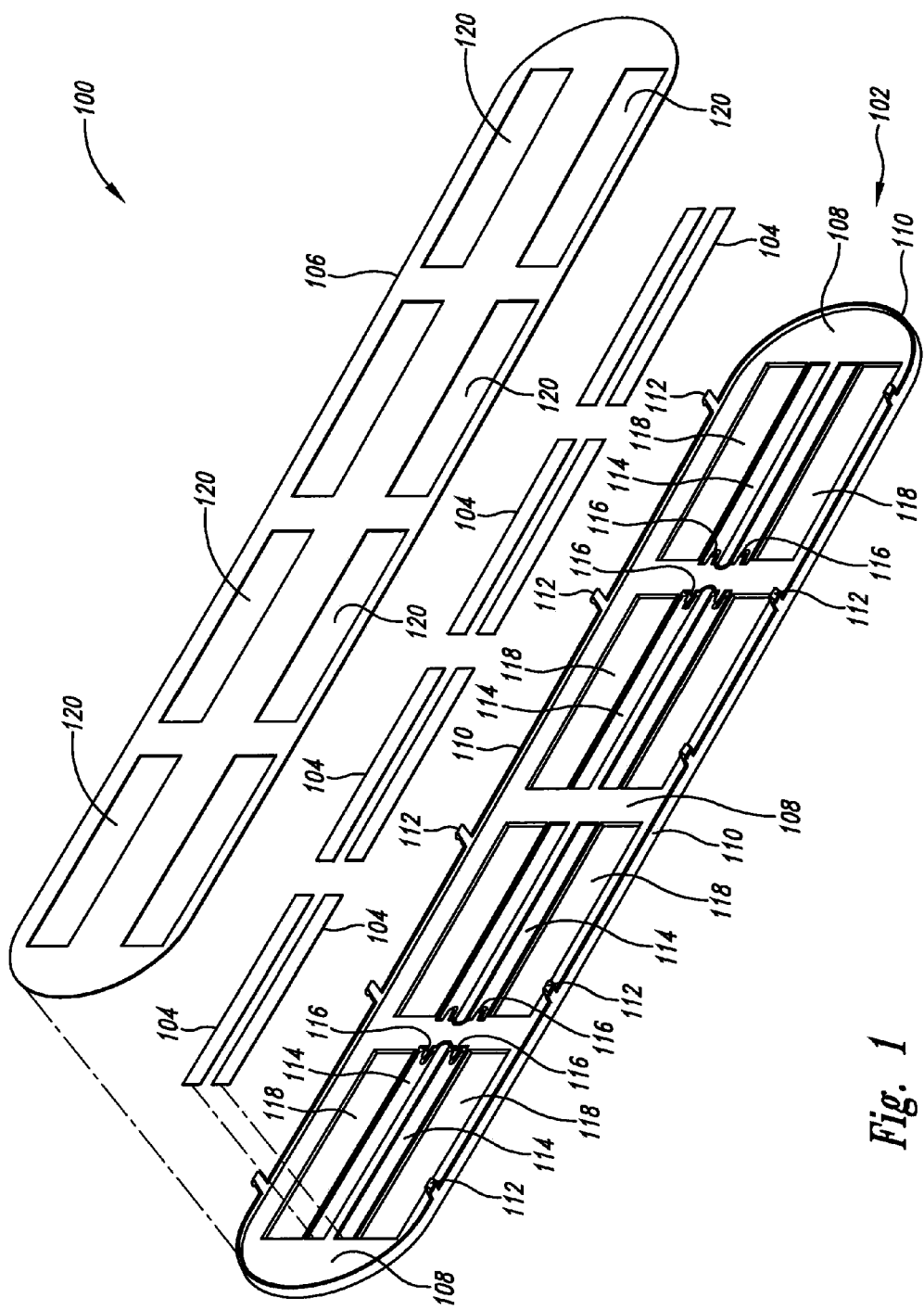
FIG. 1 is an exploded rear perspective view of a portion of an enhanced patch panel indicia system.

A portion of a first implementation of an enhanced patch panel indicia system 100 of a 2RU ("rack unit") size is shown in FIG. 1 to include a cover 102, labels 104 as auxiliary indicia receivers, and a backing 106 as the primary indicia receiver. The In practice, the backing 106, as the primary indicia receiver, would be marked to contain information and/or graphics regarding equipment, connections, or other desired details. The labels 104, as auxiliary indicia receivers, typically would be reserved for occasions to modify information and/or graphics already presented on the backing 106 or to supplement the information and/or graphics already presented with additional information.

The cover 102 has a back surface 108 bordered along the periphery of the cover by a raised edge 110 with rearwardly projecting clips 112 positioned therealong. The back surface 108 is shaped to receive the backing 106 with the raised edge 110 bordering the backing. Pairs of elongated recessed portions 114 are medially positioned along the back surface 108 of the cover 102, with the recessed portions arranged in upper and lower rows extending along the length of the cover 102, each of the recessed portions shaped to receive a different one of the labels 104. For each of the recessed portions 114, a stub member 116 located at an end portion thereof projects above the recessed portion thereby providing a gap for one of the labels 104 to be slipped therein for coupling with the label in the recessed portion. In other implementations, the labels 104 if used can be coupled to the cover 102 with tape, semi-adhesive backing or other adhesive means without need of the recessed portions 114. Elongated cover apertures 118 are arranged in upper and lower rows extending along the length of the cover 102 and located with pairs of the elongated cover apertures straddling, one above and one below, each pair of the recessed portions 114 to align with elongated panel apertures 136 of an enhanced patch panel 130 discussed below and shown in FIG. 2. The backing 106 has similar elongated backing apertures 120 positioned to align with the elongated cover apertures 118 when the backing is received by and engaged with the cover 102.

The cover 102 may be made from transparent and/or semi-transparent (translucent) material to allow at least a portion of visible light to pass therethrough. The cover 102 can be made from colored and/or non-colored materials such as plastic, polymers, or other suitable light transmissive materials. Portions of the cover 102 can be made from dissimilar materials. For instance, the recessed portions 114 of the cover 102 can be made from a clear, transparent material so as to make visible the labels 104 positioned in the recessed portions, whereas other portions of the cover can be made from a colored, translucent material. In other implementations, where the recessed portions 114 and the labels 104 are not used, selected portions of the cover 102 or the entire cover may be made from a material allowing any information and/or graphics on the backing 106 to be visible through the cover 102.

Alternatively, the cover 102 can be made from a single type of material. The labels 104 are shown to be shaped in the form of strips, but other shapes can be implemented. The labels 104 and the backing 106 can be made from the same or dissimilar materials such as from paper, cardstock, plastic, fiberboard, metal or other material that can retain markings thereon. Both the labels 104 and the backing 106 can have such markings as printing, writing, symbols, numbers, letters, colors, patterns, labeling, logos, identifications or other markings thereon.

Some of the indicia can be associated with port numbers, type, style, make, manufacturer, technology or other characteristics of rack equipment, wiring closet equipment, etc. Since one of the labels 104 can typically be replaced more economically than the backing 106 and is located adjacent one of the panel apertures 136 of the patch panel 130 during operation, markings on the label can be of a relatively less permanent nature than on the backing and can be more readily directed to a particular connector or port that may be associated with the adjacent panel aperture.

Figure 2:
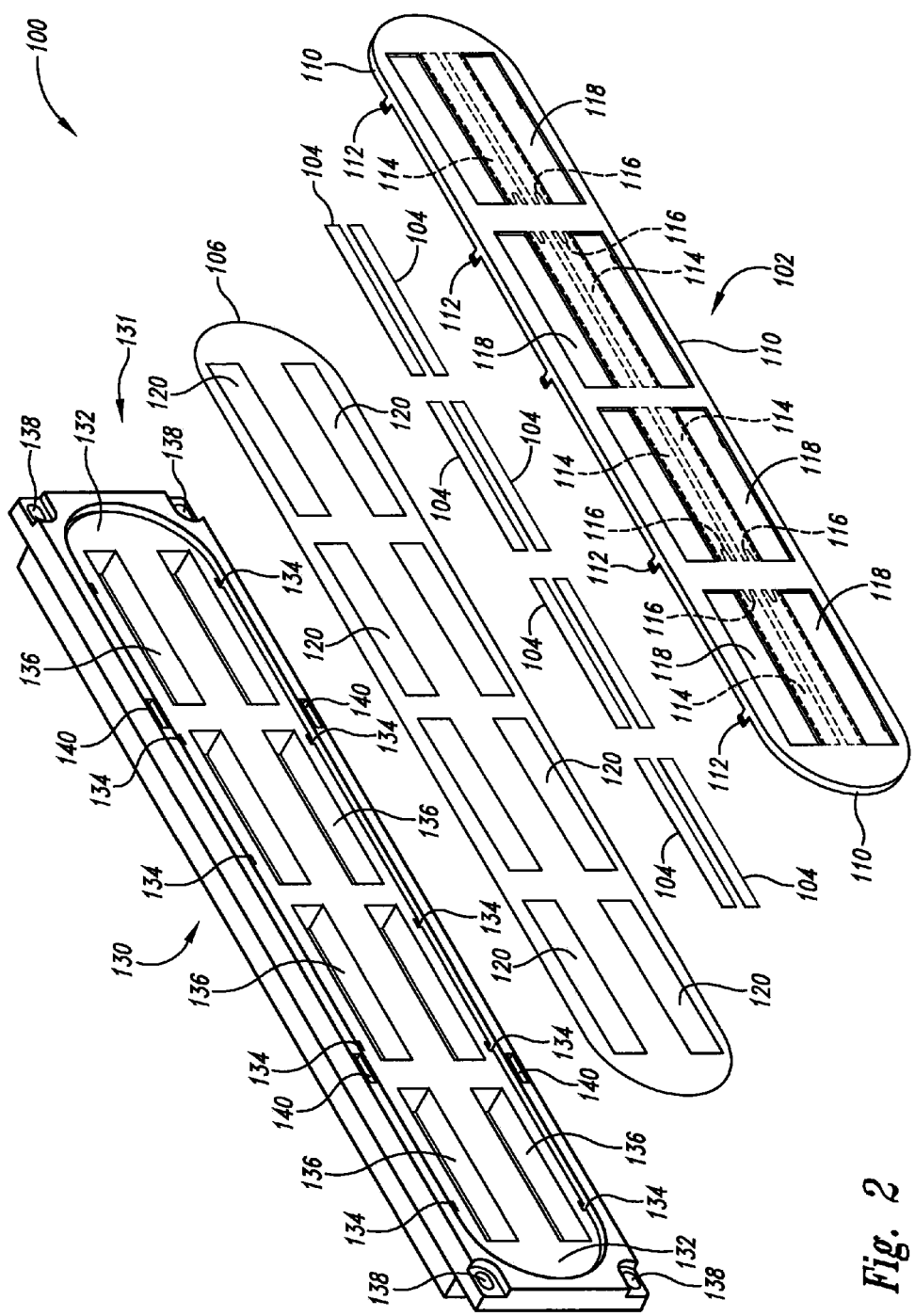
FIG. 2 is an exploded front perspective view of the portion of the indicia system of FIG. 1 and further including an enhanced 2RU patch panel.

As shown in FIG. 2, the indicia system 1 00 further includes the patch panel 130 having a front face 131, a portion of which has a recessed area 132 with tabs 134 peripherally positioned therealong to correspond and snap-fit engage with the clips 112 of the cover 102 when the cover is received by the patch panel. The recessed area 132 of the patch panel 130 is correspondingly shaped to receive the cover 102 therein with the backing 106 being positioned therebetween.

Figure 3:
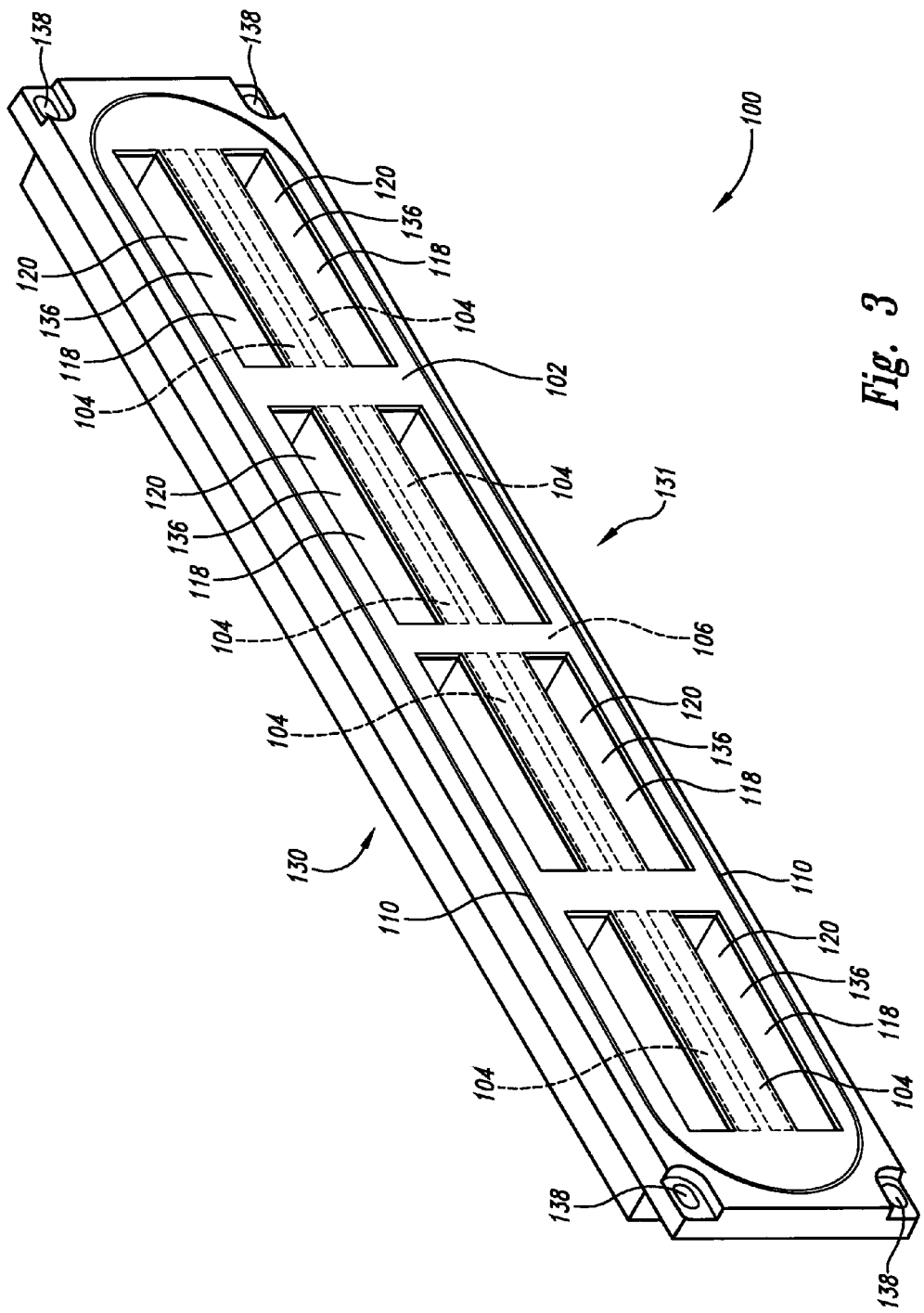
FIG. 3 is a front perspective view of the indicia system of FIG. 2.

The elongated panel apertures 136 of the patch panel 130 receive patch panel modules, as discussed below. The elongated panel apertures 136 are arranged in upper and lower rows extending along the length of the patch panel 130. The patch panel 130 has holes 138 for rack mounting and apertures 140 to receive cable management supports, as discussed below. The backing 106 and the cover 102 are shown in FIG. 3 received by the patch panel 130 with the labels 104 received by the cover and visible through the cover. In other implementations, the cover 102 can couple with other styles of patch panels (some having front portions without the recessed area 132) to fully or partially cover portions of the front face 131 of the patch panels other than the panel apertures 136.

Figure 4:
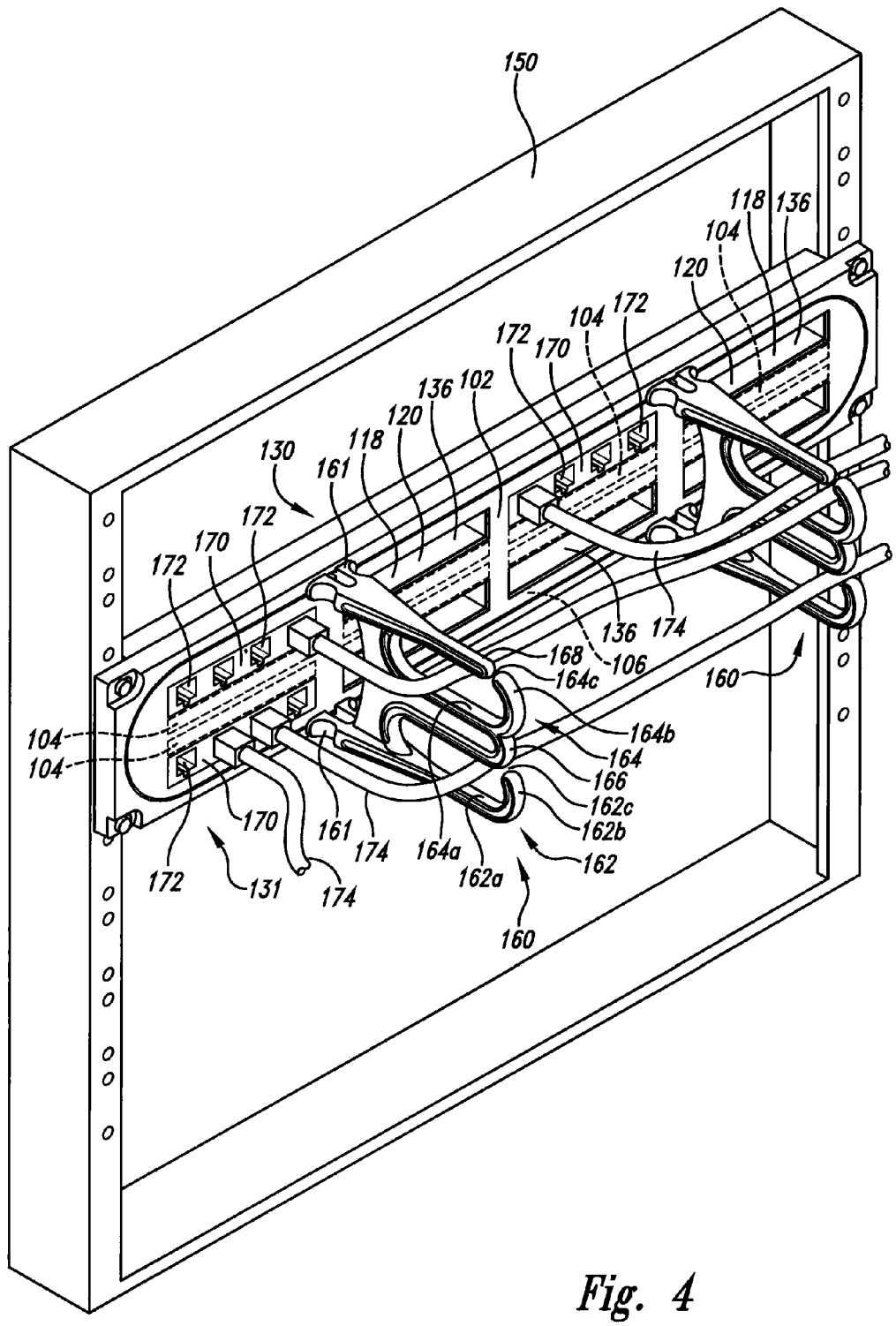
FIG. 4 is a perspective view of the indicia system of FIG. 2 coupled to an equipment rack.

The patch panel indicia system 100 is shown in FIG. 4 mounted to an equipment rack 150 and having cable management supports 160 coupled to the system by insertion of attachment portions 161 of each support into a different one of the apertures 140 of the patch panel 130. Each of the supports 160 includes a forwardly extending lower elongated member 162 with a horizontal surface 162a for supporting one or more patch cables and other cables 174 passing thereover and a forwardly extending upper elongated member 164 with a horizontal surface 164a for supporting one or more patch cables and other cables 174 passing thereover. The upper elongated member 164 is spaced above and vertically aligned with the lower elongated member 162, with a middle portion 166 positioned therebetween and depicted as extending forwardly below and in alignment with the upper elongated member.

The lower elongated member 162 further includes an upwardly extending end portion 162b extending toward and within a gap distance 162c of an end portion of the middle portion 166 to allow cables to pass therethrough for positioning for support by the horizontal surface 162a of the lower elongated member. The upper elongated member 164 further includes an upwardly extending end portion 164b extending toward and within a gap distance 164c of an end portion of a forwardly extending top elongated member 168 spaced above the upper elongated member 164 and in alignment therewith to allow cables to pass therethrough for positioning for support by the horizontal surface 164a of the upper elongated member. The middle portion 166 serves to further space the horizontal surface 162a of the lower elongated member 162 an additional vertical distance from the horizontal surface 164a of the upper elongated member 164.

The supports 160 are preferably located in the space between laterally adjacent ones of the elongated cover apertures 118 and corresponding pairs of recessed portions 114 so as not to obscure view of the backing 106 configured to receive markings thereon or the labels 104 with markings thereon in the recessed portions so as to allow any markings on the backing and labels to be viewed when cables are extending between the lower elongated members 162 and/or the upper elongated members 164 of the supports 160.

Patch panel modules 170 having receptacles 172 to receive patch cables and other cables 174, are coupled with the patch panel 130 within the panel apertures 136 and are accessed through the aligned cover aperture 118 and the backing aperture 120. As depicted in FIG. 4, the vertical separation provided by the middle portion 166 keeps the cables 174 extending between the lower elongated members 162 of the supports 160 and the cables extending between the upper elongated members 164 of the supports from blocking the view of indicia found on either a portion of the backing 106 or a label 104 located between upper and lower rows of the elongated panel apertures 136.

Figure 5:
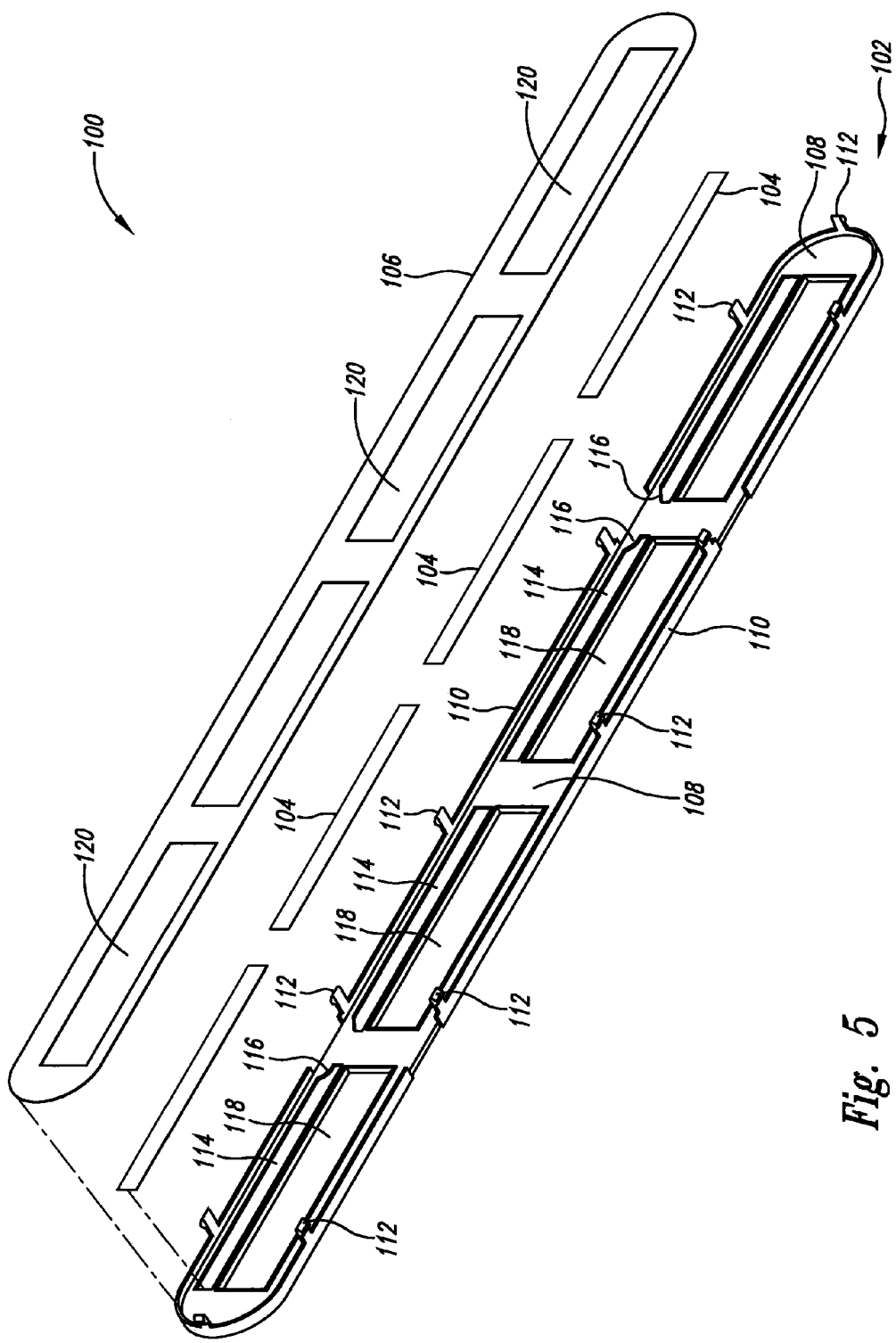
FIG. 5 is an exploded rear perspective view of a portion of a second implementation of the enhanced patch panel indicia system of FIG. 1.
Figure 6:
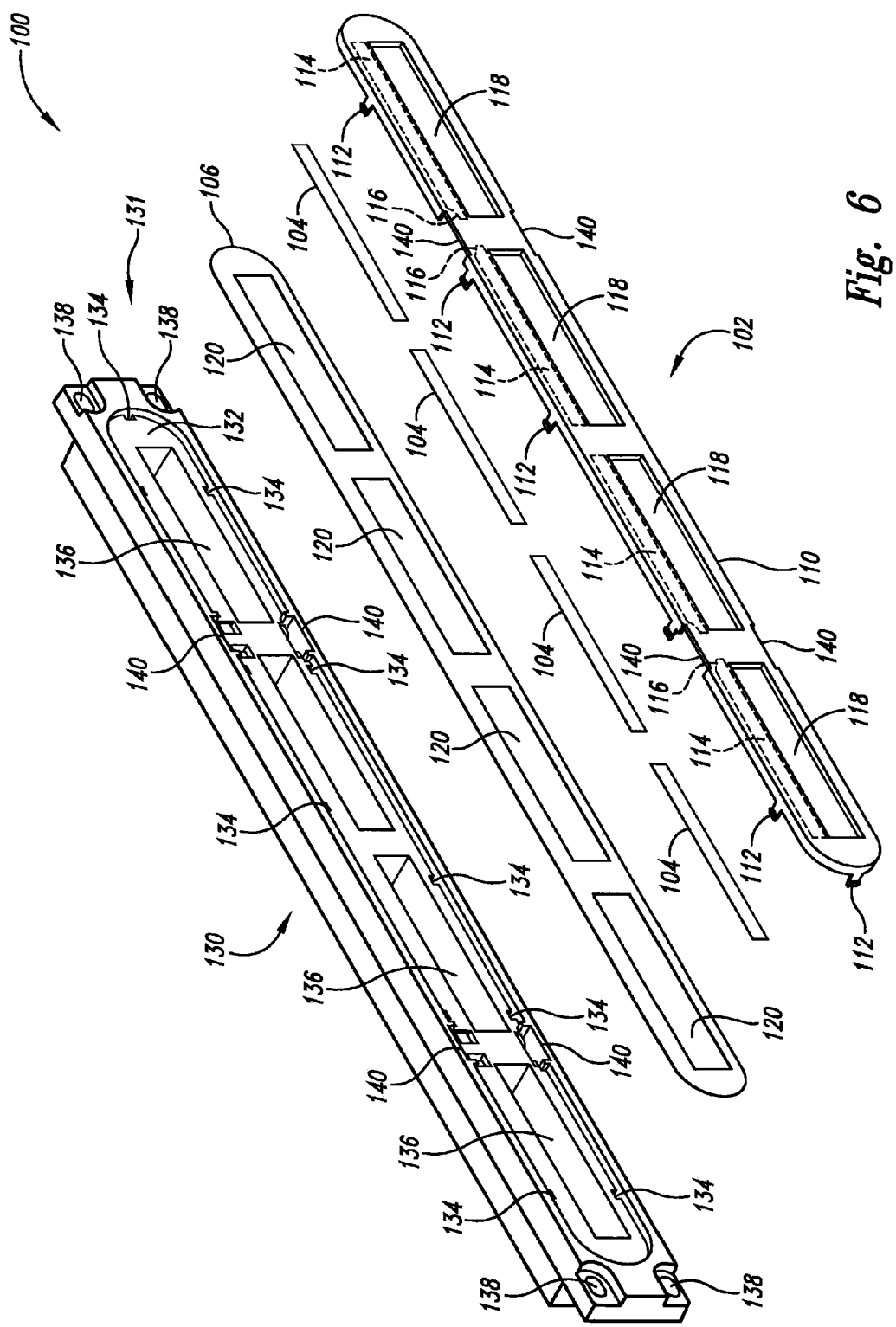
FIG. 6 is an exploded front perspective view of the portion of the indicia system of FIG. 5 and further including an enhanced 1 RU patch panel.
Figure 7:
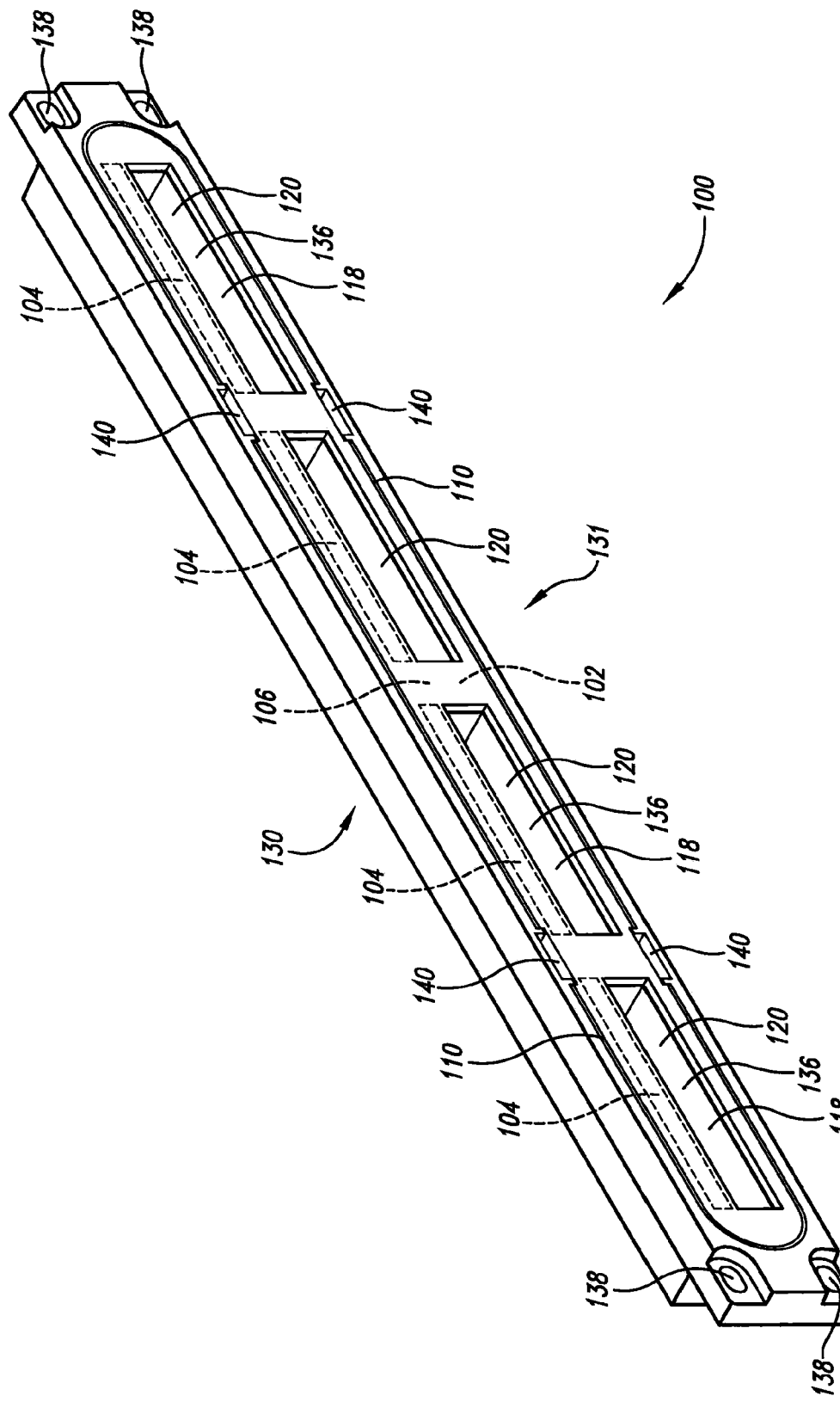
FIG. 7 is a front perspective view of the indicia system of FIG. 6.

A second implementation of the enhanced patch panel indicia system 100 of a 1RU size is shown in FIGS. 5-7 and has the same basic components and construction as the first implementation of FIGS. 1-4. Corresponding components of the second implementation are similarly numbered. In the second implementation the elongated panel apertures 136 are arranged in a single row extending along the length of the patch panel 130 and the elongated cover apertures 118 are arranged in a single row extending along the length of the cover 102, with the elongated recessed portions 114 arranged in a single row positioned along the back surface 108 of the cover 102, each above one of the elongated cover apertures 118.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The invention claimed is:

1. A system for use with a patch panel having a front face with panel apertures formed therein, each panel aperture corresponding to at least one receptacle, the system comprising: labels; a cover having a portion made from a material to allow at least a portion of visible light to pass therethrough, the cover being couplable to the front face of the patch panel, the cover comprising cover apertures sized and positioned to align with the panel apertures, the cover further comprising label receiving portions positioned adjacent the cover apertures and receiving the labels; and a backing comprising markings, the backing being couplable to the front face of the patch panel and sized and shaped to fit between the cover and the front face of the patch panel, at least a portion of the markings on the backing being at least partially visible through the portion of the cover allowing the portion of visible light to pass therethrough, the labels being positioned adjacent to and modifying the markings on the backing, the backing comprising apertures sized and positioned to align with both the panel apertures and the cover apertures, the at least one receptacle corresponding to each of the panel apertures being accessible through the panel aperture, the backing, and the cover apertures aligned with the panel aperture.

2. The system of claim 1, further including first and second cable supports, each of the first and second cable supports coupled to the front face of the patch panel and extending therefrom, each of the first and second cable supports having a lower elongated member, an upper elongated member, and a middle portion therebetween, the middle portion positioned to align with an elongated portion of the backing configured to receive markings thereon to allow the elongated portion of the backing to be viewed when cables are extending between the lower elongated member of each of the first and second supports in front of a portion of the backing other than an elongated portion of the backing and when cables are extending between the upper elongated member of each of the first and second supports in front of a portion of the backing other than the elongated portion of the backing.

3. The system of claim 1, wherein the labels received inside the label receiving portions are at least partially viewable through portions of the cover.

4. The system of claim 3 wherein the label receiving portions comprise recessed portions each configured to receive a different one of the labels, the recessed portions being medially positioned along the cover, each recessed portion adjacent a different one of the cover apertures.

5. The system of claim 3 wherein the label receiving portions comprise recessed portions each configured to receive a different one of the labels.

6. The system of claim 5 wherein the cover has a back surface and the recessed portions are medially positioned along the back surface of the cover.

7. The system of claim 5 wherein each of the recessed portions has an end portion and the cover includes a plurality of stub members, each stub member located at the end portion of a different one of the recessed portions and positioned to project to a position spaced apart from the recessed portion to provide a gap sized for one of the labels to be received therein for coupling of the label with the cover.

8. The system of claim 3 wherein the cover includes a plurality of stub members each positioned to provide a gap sized for one of the labels to be received therein for coupling of the label with the cover.

9. The system of claim 1 wherein the cover has a periphery and a raised edge extending around the periphery of the cover, the raised edge bordering the backing when the backing is positioned between the cover and the front face of the patch panel.

10. The system of claim 1 wherein the cover includes clips for snap-fit engagement with the patch panel.

11. The system of claim 10, for use with the patch panel including tabs, wherein the clips of the cover are positioned to lockably engage with the tabs when the cover is coupled to the front face of the patch panel.

12. The system of claim 1, for use with a plurality of cables and the patch panel having the panel apertures each configured to receive a patch panel module comprising the at least one receptacle corresponding to the panel aperture, wherein the cover and backing apertures aligned with each of the panel apertures are sized and shaped to permit at least a portion of the plurality of cables to pass therethrough to be received by the at least one receptacle corresponding to the panel aperture.

13. The system of claim 1 wherein the shape and size of each of the cover apertures are substantially the same as the shape and size, respectively, of the panel aperture with which the cover aperture corresponds.

14. The system of claim 1, for use with the front face of the patch panel having a recessed area, wherein the cover is shaped and sized to fit into the recessed area.

15. For coupling with an equipment rack, a system comprising:
 a plurality of labels configured to receive markings thereon;
 a patch panel having a front face with panel apertures formed therein;
 a cover having a portion made from a material to allow at least a portion of visible light to pass therethrough, the cover being couplable to the patch panel and positioned adjacent to the front face of the patch panel when coupled to the patch panel, the portion of the patch panel comprising label receiving portions each configured to receive a different one of the labels and cover apertures sized and positioned to align with the panel apertures when the cover is coupled to the patch panel; and
 a backing configured to receive markings thereon, the backing sized and shaped to fit between the cover and the front face of the patch panel when the cover is coupled to the patch panel, at least a portion of the backing configured to receive markings thereon being at least partially visible through the portion of the cover allowing the portion of visible light to pass therethrough when the cover is coupled to the patch panel, labels received by the label receiving portions modifying the markings on the backing, the backing comprising apertures sized and positioned to align with both the panel apertures and the cover apertures, each of the panel apertures being accessible through the backing and cover apertures aligned with the panel aperture.

16. The system of claim 15, further including first and second cable supports, each of the first and second cable supports coupled to the front face of the patch panel and extending therefrom, each of the first and second cable supports having a lower elongated member, an upper elongated member, and a middle portion therebetween, the middle portion positioned to align with an elongated portion of the backing configured to receive markings thereon to allow the elongated portion of the backing to be viewed when cables are extending between the lower elongated member of each of the first and second supports in front of a portion of the backing other than the elongated portion of the backing and when cables are extending between the upper elongated member of each of the first and second supports in front of a portion of the backing other than the elongated portion of the backing.

17. The system of claim 15 wherein the panel apertures are configured to receive patch panel modules each comprising a plurality of receptacles.

18. The system of claim 15 wherein the front face of the patch panel has a recessed area, the cover being shaped and sized to fit into the recessed area when the cover is coupled to the front face of the patch panel.

19. A labeling system for use with a plurality of patch panel modules coupled to a support structure and a plurality of labels, each patch panel module comprising a plurality of receptacles, the labeling system comprising: a cover comprising a back portion, a first viewing portion, a plurality of second viewing portions, and a first plurality of apertures, the back portion being configured to be removably couplable to the support structure over the plurality patch panel modules, each of the first viewing portion and the plurality of second viewing portions being constructed from a transparent or semi-transparent material, and the first plurality of apertures being aligned with the plurality patch panel modules and providing access to the plurality of receptacles of each of the plurality of patch panel modules through the cover, each of the plurality of second viewing portions being adjacent a different one of the first plurality of apertures and comprising a label receiving portion receiving at least one of the plurality of labels; and a first backing comprising markings, and a second plurality of apertures, the first backing being positionable adjacent the back portion of the cover and removably coupled to the support structure by the cover, the second plurality of apertures being aligned with the plurality of patch panel modules, and providing access to the plurality of receptacles of each of the plurality of patch panel modules through the first backing, the first viewing portion of the cover being positioned adjacent the markings of the first backing such that at least a first portion of the markings of the first backing are visible through the first viewing portion of the cover, the ones of the plurality of labels received by the label receiving portions of the plurality of second viewing portions covering at least a second portion of the markings of the first backing.

20. The labeling system of claim 19, further comprising a second backing like the first backing but having markings different from the markings of the first backing, the cover being uncouplable from the support structure to uncouple the first backing from the support structure, and after the first backing has been uncoupled from the support structure, the cover being couplable to the support structure to couple the second backing to the support structure.

21. The labeling system of claim 19 for use with a different plurality of labels, wherein the cover is removable from the support structure so that selected ones of the plurality of labels may be removed from the label receiving portions of the plurality of the second viewing portions, and replaced with selected ones of the different plurality of labels.

22. The system of claim 1, wherein the cover is further configured to be selectively couplable to and uncouplable from the front face of the patch panel.

23. The system of claim 22, wherein the backing is a first backing, and the system further comprises a second backing like the first backing but comprising markings different from those of the first backing, wherein when the cover is uncoupled from the front face of the patch panel:

the first backing is removable from between the cover and the front face of the patch panel, and the second backing is positionable between the cover and the front face of the patch panel, the cover being subsequently couplable to the front face of the patch panel to couple the second backing to the patch panel.

24. The system of claim 15, wherein the cover is further configured to be selectively couplable to and uncouplable from the patch panel.

25. The system of claim 24, wherein the backing is a first backing, and the system further comprises a second backing like the first backing but comprising markings different from those of the first backing, wherein when the cover is uncoupled from the patch panel:

the first backing is removable from between the cover and the front face of the patch panel, and the second backing is positionable between the cover and the front face of the patch panel, the cover being subsequently couplable to the patch panel to couple the second backing to the patch panel.

* * * * *